March 3, 1964  N. P. WORDEN  3,123,309
REAR IMPLEMENT FLOOD AND WARNING LAMP
Filed March 9, 1959  3 Sheets-Sheet 1
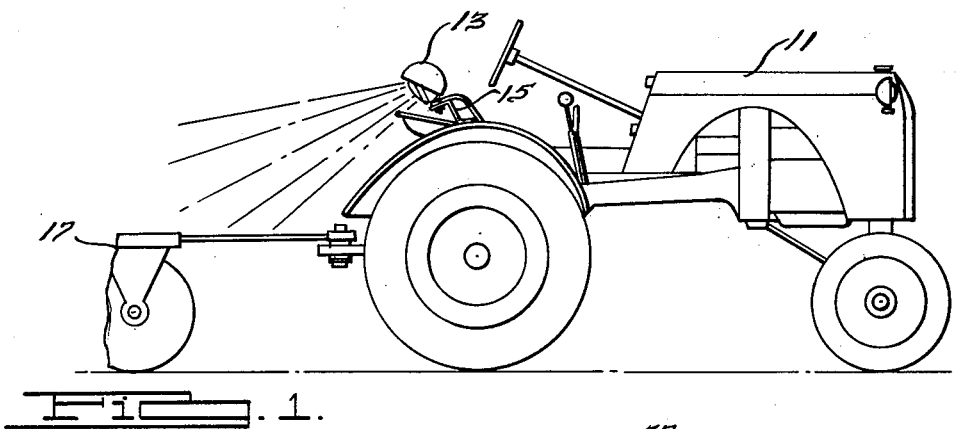
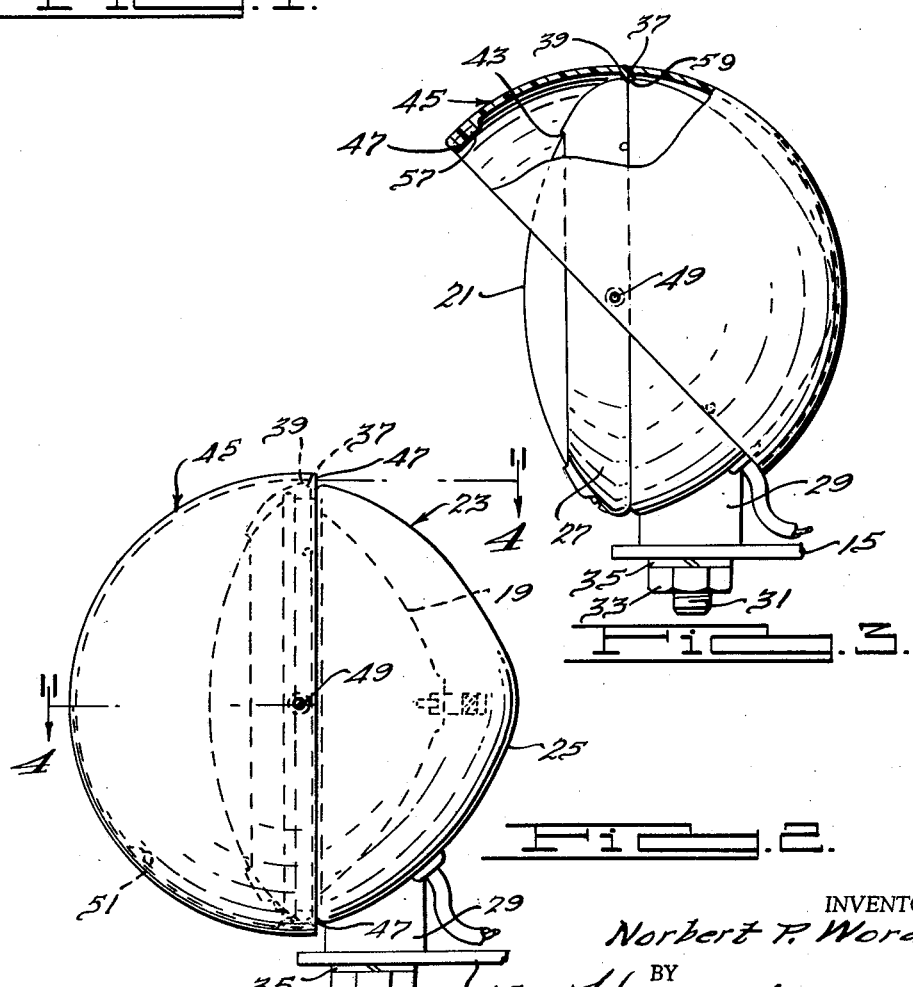
INVENTOR.
Norbert P. Worden,
BY
Harness, Dickey & Pierce.
ATTORNEYS.

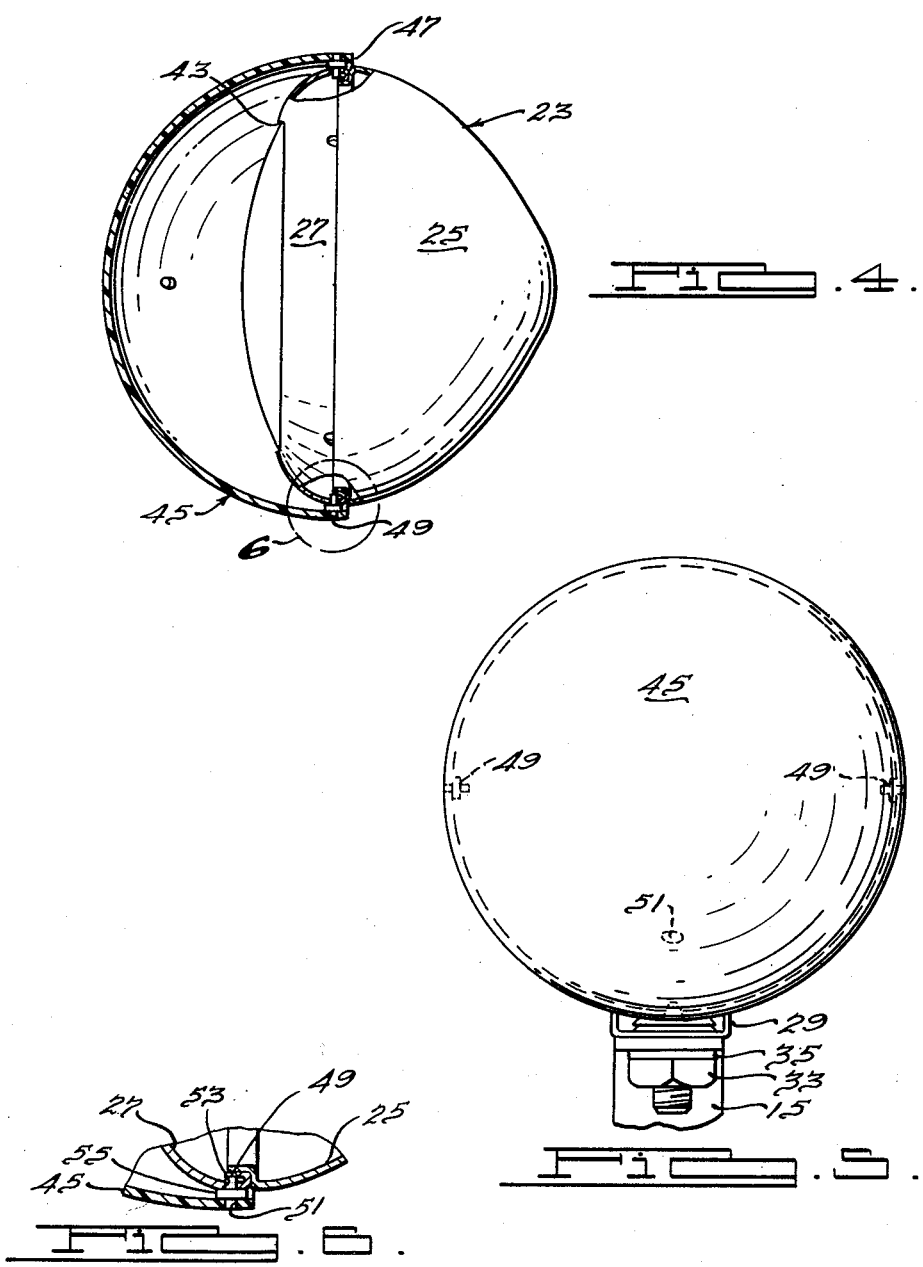

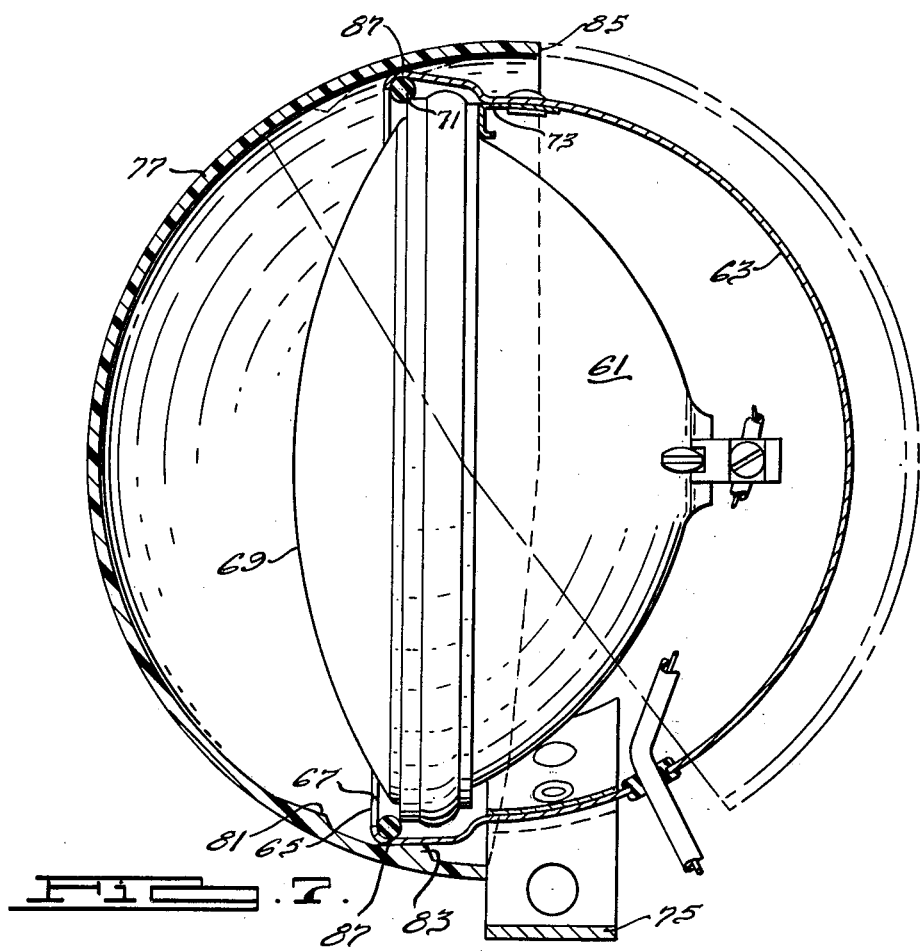
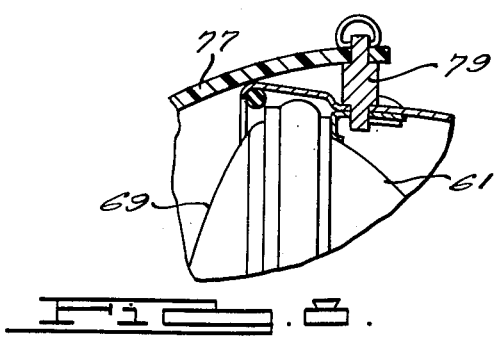

United States Patent Office 3,123,309
Patented Mar. 3, 1964

1

3,123,309
REAR IMPLEMENT FLOOD AND
WARNING LAMP
Norbert P. Worden, Detroit, Mich., assignor to C. M.
Hall Lamp Company, Detroit, Mich., a corporation of
Michigan
Filed Mar. 9, 1959, Ser. No. 798,252
3 Claims. (Cl. 240—46.23)

This invention relates to vehicle flood lamps and particularly to a combination rear flood and warning lamp for tractors or the like.

It is an object of the present invention to provide a lamp adapted for mounting on a tractor or the like which may be used for the illumination of the area behind the tractor during night work or, alternatively, as a rear warning light when the tractor is driven on a road or highway at night.

It is another object of the present invention to provide a vehicular rear flood and warning light of the above character which eliminates the necessity for separate tail-lights.

It is still another object of the present invention to provide a colored lens filter for a vehicle flood lamp which may be conveniently adjusted between an open position exposing the lamp and a closed position covering the lens of the lamp.

It is a further object of the present invention to provide a flood lamp of the above character having an adjustable light filter provided with retention means for securely holding the filter in either an open or closed position.

It is another object of the present invention to provide a lens filter for a rear implement flood lamp which may be easily installed on the flood lamp and which may be used with presently commercially available lamp assemblies.

It is still another object of the present invention to provide a lens filter for a vehicle flood lamp which in its retracted or open position does not add appreciably to the area occupied by the lamp and does not obstruct the view or movement of the vehicle operator.

It is another object of the present invention to provide a filter for a flood lamp which is operative to completely cover the light emitting area of the lamp and to prevent the escape of random white light.

It is still another object of the present invention to provide a rear implement flood and warning lamp of the above character which is inexpensive of manufacture, sturdy in construction and attractive in appearance.

Other objects and advantages of the present invention will become apparent from the following detailed description taken in conjunction with the accompanying drawings wherein:

FIGURE 1 is an elevational view of a tractor and implement showing the general mounting and usage of a lamp embodying the principles of the present invention;

FIG. 2 is a side elevational view of a lamp embodying the principles of the present invention, the filter of the lamp being illustrated in a closed position;

FIG. 3 is a view similar to FIG. 2 with the cover in the open position;

FIG. 4 is a view partly in section of the structure illustrated in FIG. 2 taken along the line 4—4 thereof;

FIG. 5 is a front elevational view of the structure illustrated in FIG. 2;

FIG. 6 is an enlarged sectional view of the structure enclosed within the circle 6 of FIG. 4;

FIG. 7 is a side view partly in section and partly in elevation showing an alternative embodiment of the invention, the open position of the cover being shown in phantom; and

2

FIG. 8 is a fragmentary sectional view similar to FIG. 6 of the alternative form of the invention illustrated in FIG. 7.

Referring now to the drawings, FIGURE 1 illustrates a tractor 11 having a lamp assembly 13 embodying the present invention mounted on a rear portion thereof by means of a bracket 15. The bracket 15 is angularly positioned so that the lamp 13 casts its light rearwardly and downwardly to illuminate an implement 17 being towed by the tractor and the ground being worked by the implement. Thus, when the tractor is being used at night, the lamp may be switched on to enable the tractor operator to maintain a constant check on the performance of the implement. During such night work, the flood lamp desirably casts a white beam on the implement to obtain maximum illumination. However, the present invention contemplates the use of the same rear implement flood lamp as a warning light when the tractor is driven on a highway or other public road. To this end, the lamp is provided with a colored filter or cover which may be positioned over the lens of the lamp so that the unit will emit a red or other colored light.

The use of a combined flood and warning lamp is of particular advantage in tractors where, upon the completion of night field work, it is frequently necessary for the farmer to drive the tractor over a highway to return home. While tractors are customarily provided with a taillight to guard against rearwardly approaching traffic, the standard taillight is a small unit, mounted low on the rear of the tractor and visible for only a limited distance. However, a tractor is a relatively slow-moving vehicle and is especially subject to being struck by fast-moving traffic approaching from the rear. Therefore, a large, brilliant red warning lamp mounted high on the rear of the tractor, constitutes a highly desirable safety device. For economy of space and cost, the use of two separate lamps for implement flood lighting and for warning purposes is undesirable and it is within the scope of the present invention to combine these functions in one unit. While the lamp assembly of the present invention is illustrated as mounted on the rear of a tractor, neither the construction of the tractor 11 nor the nature of the implement 17 constitute any part of the present invention but are illustrated only as an example of the type of equipment with which the lamp assembly of the present invention may be installed. In practice, the lamp of the present invention might be used to advantage on wrecking trucks, fire trucks, road construction equipment, or any other vehicle on which it was desired to have one lamp usable for either flood or warning purposes.

The construction of the lamp assembly 13 is illustrated in greater detail in FIGS. 2 and 3 and comprises a lamp such as a sealed beam unit 19 having a lens 21 and nested within a metal housing 23. The housing 23 includes a generally bowl-shaped body portion 25 spacedly surrounding the rear portion of the lamp and an annular molding 27, commonly called a door or a bezel by the trade, surrounding the lens 21 and secured to the body 25. The sealed beam unit 19 may be supported in the housing 23 by any convenient method, many of which are well known in the trade. The lamp assembly may be supported on the bracket 15 by any convenient means, such as by a support 29 welded or otherwise fastened to the underside of the body 25 and carrying a threaded stud 31 which passes through the bracket 15 for the reception of a nut 33 and a washer 35. The abutting edges of the bezel 27 and body 25 are turned inwardly slightly to define a peripheral groove 37, which is disposed immediately behind the outer periphery 39 of the bezel 27. The body 25 spacedly encloses the rear of the sealed beam unit 19 and, being made from metal, protects the lamp 19 against breakage. All of the light produced by the lamp is emitted from the unit through the circular opening defined by the inner diameter 43 of the bezel 27 and in which the lens 21 of the lamp is positioned.

A concavo-convex colored light filter or cover 45 is pivotally mounted on the housing 23 for adjustment between a position covering the lens 21 and a position around and behind the housing. The filter 45 may be otherwise described as being cup or bowl-shaped and in its preferred form it is a hemispherical shell having an annular lip 47 adapted to closely surround the outer periphery 39 of the bezel 27 when the filter 45 is in a closed position.

Pivotal support for the filter is provided by a pair of shouldered pivot pins 49 having their outer ends fitted in apertures 51 formed on diametrically opposite sides of the filter adjacent its periphery 39. The inner ends of the pins 49 are fitted in aligned apertures 53 formed on opposite sides of the bezel 27. Enlarged central shouldered portions 55 of the pins 49 keep the filter from rubbing against the bezel 27 and also serve to maintain the pins in place.

The filter 45 is adjustable between a closed position surrounding and covering the lens 21 and an open position conformably and closely surrounding the body portion 25. During night travel of the tractor on a highway the filter is positioned over the lens to diffuse the beam cast and present a large, colored light to rearwardly approaching traffic. Retention means for holding the filter in this postion is provided by an inwardly projecting first detent 57 integrally molded into the filter 45 midway between the pivot pins 49 and frictionally engageable with the outer periphery 39 of the bezel 27 at the bottom thereof. A second detent or bead 59 is integrally formed on the inner surface of the filter inwardly from the first detent 57 to engage in the top of the groove 37 when the filter is retracted to an open position. In movement of the filter to its retracted position the second detent 59 will first contact the outer periphery 39 of the bezel, but upon the application of slight force the filter 47 will flex sufficiently to permit the second detent 59 to ride over the outer periphery 39 and drop into the groove 37. The filter will thus be held in the open position as illustrated in FIG. 3. As may be seen in FIG. 3, the presence of the support 29 prevents complete 180 degree rotation of the filter from the closed to the open position and, as a consequence, a portion of the filter overhangs the lens 21 of the lamp. However, the filter is substantially out of the path of light cast by the lamp and the overhang portion serves as a hood or shield to reduce possible glare in the eyes of the tractor operator.

The filter 45 is preferably formed from a somewhat flexible translucent or transparent plastic material which is tinted red or any other desired color. Plastic is preferred as a filtering media over glass, not only because of its superior resistance to breakage, but also because of its ability to be flexed. Flexure of the filter 45 is advantageous to the holding ability and operation of the detents 57 and 59. Additionally, the ability of the filter 45 to be flexed facilitates the installation of the filter on the housing 23. For this purpose, the pivot pins 49 are first inserted in the apertures 51 of the filter. They may either be loosely inserted in the apertures 51 or, preferably, press fit therein. The filter is then squeezed on its opposite sides to spread the pivot pins 49 apart. The annular lip 47 of the filter is thus deformed to an elliptical shape with the pivot pins 49 being on the major axis of the ellipse. By this means the inner ends of the pivot pins may be moved apart a sufficient distance to permit the positioning of the pivot pins 49 opposite the apertures 53 of the bezel 27. By the release of pressure on the filter 45, the pivot pins 49 will enter the apertures 53 and be held therein by the normal shape of the filter. In the event of damage or breakage, the filter 45 may again be flexed to permit its removal and the installation of a new filter. Alternatively, the pivot pins 49 may be first inserted in the housing apertures 53 and the filter 45 thereafter distorted to spread the apertures 51 a sufficient distance apart to fit over the outer ends of the pivot pins 49.

FIGS. 7 and 8 illustrate a slightly modified embodiment of the invention in which a sealed beam unit 61 is mounted within a generally bowl-shaped housing 63. The housing 63 is constructed in one piece and is provided with an inwardly turned annular flange portion 65 defining a circular opening 67 in which the lens 69 of the sealed beam unit 61 is positioned. The sealed beam unit 61 may be supported within the housing 63 by any convenient means, such as a snap ring 71 and annular bracket 73. A supporting frame 75 is welded or otherwise secured to the housing 63 for supporting the unit on means such as the bracket 15. A generally bowl-shaped plastic filter 77 is mounted on the housing 63 for pivotal adjustment about a transverse horizontal axis. Pivotal support for the filter 77 is provided by means of shouldered hinge pins 79 which function in a manner similar to the hinge pins 49 of the prior embodiment of the invention. The filter 77 differs from the filter 45 of the previous embodiment in the detent or retention means formed thereon. Such retention means includes a pair of closely spaced inwardly projecting detents 81 and 83 which are positioned adjacent the substantially annular lip 85 of the filter 77 and are adapted to be positioned on opposite sides of the outer periphery 87 of the housing 63. Upon movement of the filter 77 to a closed position the outermost detent 83 frictionally engages the outer periphery 87 at the bottom thereof. Upon pivotal adjustment of the filter 77 to a retracted position the innermost detent 81 cams past the outer periphery 87 of the housing 63 to retard inadvertent closure of the filter.

It will be seen that in either embodiment of the present invention the filter surrounds and encloses the lens of the lamp to prevent the escape of random light when the lamp is being used for warning purposes. Upon retraction of the filter, however, the filter pivots to a position closely surrounding and contiguous to the housing in which the sealed beam unit is mounted. By such means the additional space occupied by the filter when in its retracted position is only slightly greater than that occupied by a lamp and housing alone and the filter does not tend to obstruct the vision or movement of the tractor operator.

During normal daytime use of the vehicle the filter may be kept in either an open or closed position. If kept in a closed position the filter will serve as a guard or shield for the lens of the lamp. The filter, being preferably made from break-resistant plastic, is less subject to breakage than the lens, which is customarily made from glass. Even if a blow is sufficient to break the filter, it may be less expensively replaced than an entire sealed beam unit.

During night field work the filter is kept in a retracted or open position to permit the lamp to cast an unfiltered white light. As is illustrated in FIG. 1, the bracket 15 is preferably angled downwardly so that the center of the light beam is directed at the implement 17. This downward position is also advantageous during the use of the lamp unit as a warning lamp when the vehicle is being driven on the highway, for the beam of light passing through the filter will not glare in the eyes of approaching drivers. However, the illuminated filter will be visible for a considerable distance to the rear.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A combination flood and warning lamp for a vehicle including a generally bowl-shaped housing having a circular opening on one side thereof and a pair of aligned apertures on opposite sides of said opening, a lamp supported in said housing for emitting light through said opening, a generally bowl-shaped colored light filter having a substantially circular lip, and a pair of axially aligned pivot pins extending inwardly from opposite sides of said filter adjacent said lip for insertion in said housing apertures, said filter being sufficiently flexible to permit distortion of said lip to an elliptical shape with the inner ends of said pivot pins a greater distance apart than said housing apertures when on the major axis of the ellipse, and said filter being pivotally adjustable on said housing between a first position covering said housing opening and a second position closely surrounding said housing and substantially out of alignment with said opening.

2. A combination flood and warning lamp for a vehicle including a generally hemispherical housing having an opening on one side thereof, a lamp supported in said housing for emitting light through said opening, a pair of axially aligned pivot pins extending outwardly from opposite sides of said housing adjacent the opening thereof, a generally hemispherical colored light filter having a circular lip and a pair of axially aligned apertures on opposite sides thereof adjacent said lip for the reception of said pivot pins, said filter being sufficiently flexible to permit distortion of said lip to an ellipse having a major axis greater than the distance between the outer ends of said pivot pins, and said filter being pivotally adjustable on said pivot pins between a first position covering said housing opening and a second position closely surrounding said housing and substantially out of alignment with said housing opening.

3. A combination flood and warning lamp including a sealed beam lamp unit provided with a lens, a housing for supporting said lamp unit having a body portion pivotally surrounding the rear of said lamp unit, and an annular bezel surrounding the lens of said lamp unit, the juncture of said bezel and said body defining a peripheral groove, a generally bowl-shaped flexible light filter pivotally mounted on said housing for adjustment between a first position covering said lens and a second position surrounding said body and substantially out of alignment with said lens, and integral inwardly projecting detent means on said filter selectively engageable in said peripheral groove by flexure of said filter for maintaining said filter in one of said adjusted positions.

References Cited in the file of this patent
UNITED STATES PATENTS

| | | |
|---|---|---|
| 1,444,739 | Geisendorfer et al. | Feb. 6, 1923 |
| 1,704,894 | Hendrikson | Mar. 12, 1929 |
| 1,947,804 | Schlared | Feb. 20, 1934 |
| 2,170,552 | De Porter | Aug. 22, 1939 |
| 2,442,504 | Miller | June 1, 1948 |
| 2,698,375 | Schmidt | Dec. 28, 1954 |